United States Patent [19]

Harcuba

[11] Patent Number: 4,559,072

[45] Date of Patent: Dec. 17, 1985

[54] PROCESS AND APPARATUS FOR PRODUCING GLASS

[75] Inventor: Siegfried Harcuba, Innsbruck, Austria

[73] Assignees: Theodor P. Harcuba, Zurich, Switzerland; Interverre Anstalt, Vaduz, Liechtenstein

[21] Appl. No.: 622,700

[22] Filed: Jun. 20, 1984

[51] Int. Cl.[4] .............................................. C03B 3/00
[52] U.S. Cl. ......................................... 65/136; 65/27; 65/134; 65/335
[58] Field of Search .................... 65/27, 134, 136, 335

[56] References Cited

U.S. PATENT DOCUMENTS

| | | | |
|---|---|---|---|
| 1,759,228 | 5/1930 | Drake | 65/335 |
| 2,122,469 | 7/1938 | Hitner | 65/136 |
| 3,397,972 | 8/1968 | Brichard et al. | 65/27 |
| 4,277,274 | 7/1981 | Chrisman | 65/134 X |
| 4,350,512 | 9/1982 | Krumwiede | 65/27 |

FOREIGN PATENT DOCUMENTS 1172318  11/1969  United Kingdom .................... 65/27

Primary Examiner—Arthur Kellogg
Attorney, Agent, or Firm—Karl F. Ross; Herbert Dubno

[57] ABSTRACT

A process for the production of glass comprises introducing cullet or frit into a glass furnace and melting it therein to form a flux, and guiding the flux along a track, which may be slightly inclined. Preheated raw material components are applied to the surface of the flux substantially in the proportion of one part of flux to between one part to nine parts of raw material components on or in the flux so as to form a glass melt. The glass melt is then refined by introducing refining materials.

27 Claims, 7 Drawing Figures

PROCESS AND APPARATUS FOR PRODUCING GLASS

FIELD OF THE INVENTION

This invention relates to a process for producing glass to make glass products by introducing cullet or frit, preheated raw material components and refining materials into a furnace, melting the starting materials and subsequently carrying out melting and fine melting. The invention also relates to an apparatus for carrying out this process.

BACKGROUND OF THE INVENTION

According to the known state of the art, the raw material components for producing glass and the refining materials are mixed with one another in the proportions necessary for the desired type of glass and are introduced into a melting end of the furnace in which they are melted as a result of the supply of heat, especially by means of burners located above the melting end, and in which Cthe necessary degassing of the melt, the so-called refining, is also carried out.

To reduce the outlay of energy required for the melting operation, it is known to introduce the mixture of raw material components into the melting end in a preheated or heated state. Since the melting end may have a depth of 0.9 m to 1.4 m, a very high outlay of energy is necessary to ensure that the raw material components are melted down completely. Furthermore, very different temperature conditions arise in the melting end. Thus, the melt has a lower temperature in the regions of the walls of the melting end than in the central region thereof. Since this in particular causes difficulties in homogenizing the melt, an exceptional outlay in terms of technology and time is required to degas completely not only the layers of melt which lie at the surface, but also the layers lying below the surface, especially those lying near the bottom of the melting end. This is because the glass bubbles contained in the molten masses located in the lower region of the furnace do not have the necessary kinetic energy available to reach the surface. To ensure that the raw material components are melted down and that the melt is refined, it is therefore necessary for the melt to remain in the melting end for a relatively long time.

The known production processes are also disadvantageous because the fine distribution appropriate to the glass batch composition, which can be achieved by mixing all the raw material components in a mixer, with correct proportions of components in each mixing batch is not necessarily present when the mixer is emptied. Since segregation can occur, this fine distribution does not take place even during subsequent transport into a supply vessel for feeding the melting end. Consequently, the distribution of raw materials can be heterogeneous even when the mixture of raw material components is introduced into a melting end in thin layers. As a result, the filling layers fall to different depths depending on the thermal gradients. Masses of different viscosities impede one another and cause convection currents which, after lengthy circulation of the layers, though helping gradually to melt them down, nevertheless contribute little to the homogenization necessary for achieving the required glass quality. Consequently, the known balance reactions between the raw material components proceed very slowly because they cannot be controlled.

Because of the large-volume design of conventional melting ends, and also because of regenerators, underfloor channels, reversing devices and recuperators of corresponding dimensions, which are arranged on statically calculated supporting structures, the melting ends are, on the one hand, extremely costly and must, on the other hand, be designed to be fixed in place as a result of their great weight and the abovementioned design. In addition, since any production of other glass products necessitates a further identical or similar glass tank, this often causes excess capacity.

Moreover, shutting down melting furnaces causes damage, and high energy costs are incurred by keeping them in operation. In glass furnaces predominantly heated by fossil fuels, the necessary outlay of energy increases sharply because of arching as a result of high radiation losses and because of the need for a greater supply of heat to the molten mass. This increased outlay of energy is required even when the batch is preheated and costly insulation is provided.

It is known from German Patent Specification No. 2,518,635 to apply the raw material components in thin layers onto the glass melt located in a melting furnace. However, even in this case, because of the large volume of the melting end, high temperature gradients arise, and these bring about convection currents causing uncontrollable migration of the layers, as a result of which the melt provided for processing is defective. Because of the very long retention time in the furnace, increases in output can be achieved only by enlarging the installation.

SUMMARY OF THE INVENTION

According, therefore, to the present invention, there is provided a process for producing glass comprising introducing cullet or frit into a furnace and melting it therein to form a flux; guiding the flux along a track; applying pre-heated raw material components to the surface of the flux substantially in the proportion of one part of flux to between one and nine parts of raw material components; employing thermal energy to melt the raw material components on or in the flux so as to form a glass melt; and introducing refining materials so as to refine the glass melt.

Preferably, the refining materials are introduced adjacent the last section of the track.

The said process enables the disadvantages of the known state of the art to be avoided, since while reducing the energy requirement, glass formation, refining and homogenization are carried out more quickly and in a more easily controllable manner than has been possible hitherto, and nevertheless a glass mass of high quality can be produced.

Preferably, the raw material components are heated to a value somewhat below the sintering temperature of a eutectic melt and applied in this state to the said flux, and they have temperatures of preferbly 350° C. to approximately 450° C. It can be advantageous, here, to mix the raw material components applied to the said flux mechanically with the latter. Appropriately, the said flux, together with the raw material components to be melted thereon or therein may be drawn off at a speed of 5 cm to 10 cm/min.

The individual raw material components, at least partially premixed with one another, may be applied to the said flux, or, according to their chemical-physical reactions, may be applied to the said flux separately from one another in succession in terms of time and place.

Heat can be supplied to the said flux by means of ohmic heat generated by electrodes projecting into the latter. Furthermore, heat can be supplied to the said flux or to the glass melt in a way known per se by means of burners or electrical heaters which heat the surface of the said flux or of the glass melt. Finally, thermal energy can also be supplied to the said flux or to the glass melt from below by means of heat conduction in plates forming the track as a result of heating the surface of the plates facing away from the said flux or glass melt.

An apparatus for carrying out the process according to the invention comprises a furnace means for introducing cullet or frit into the furnace; means for melting the so-introduced cullet or frit to form a flux; a track; means for guiding said flux along the track; preheating means for preheating raw material components; means for applying the pre-heated raw material components to the surface of the said flux; heating means for melting the raw material components on or in the flux so as to form a glass melt; and reans for introducing refining materials into the furnace so as to refine the glass melt.

The means for melting the so-introduced cullet or frit may comprise a subdivided chamber located in front of the upper end of the track and equipped with heaters. The means for applying the raw material components to the said flux may be formed by feeding devices and, if appropriate, vibrating devices located after the dosing devices and intended for mixing the raw material components. There may be heating electrodes arranged along the track and/or burners or electrical heaters.

According to features which are also preferred, baffles, especially sills, are provided along the course of the track, in particular to make it easier for dissociation gases to escape. Furthermore, in the first section of the track, there can be vertically adjustable refractory agitators which pass through the ceiling of the furnace and which mix the liquid and solid layers at least partially and/or cause currents. In further sections of the track, there can be agitators which pass through the side walls of the furnace and which project into the glass melt and cause currents, by means of which boundary layers are dissolved and thermally decomposed and degassing is assisted.

It is particularly appropriate if the apparatus is mounted so as to be vertically adjustable and/or pivotable about a vertical axis as a single unit, since different glass-making installations can thereby be supplied by means of a single apparatus.

The pre-heating means can be formed by a heatable drum which is rotatable about an inclined axis and at the upper end face of which the mixed raw material components are supplied, and in which they are heated and from which they are fed, through the lower end face, to at least one feeding roller via a vibrating device. The rotary drum can be made double-walled to provide an annular space, combustion gases flowing through the annular space and the raw material components being located in the interior. Moreover, a heater fixed to the frame, for example a tube heated by means of infra-red radiators, can pass through it centrally.

BRIEF DESCRIPTION OF THE DRAWING

The invention is illustrated, merely by way of example, in the accompanying drawing, in which.

SPECIFIC DESCRIPTION

Figure 1:
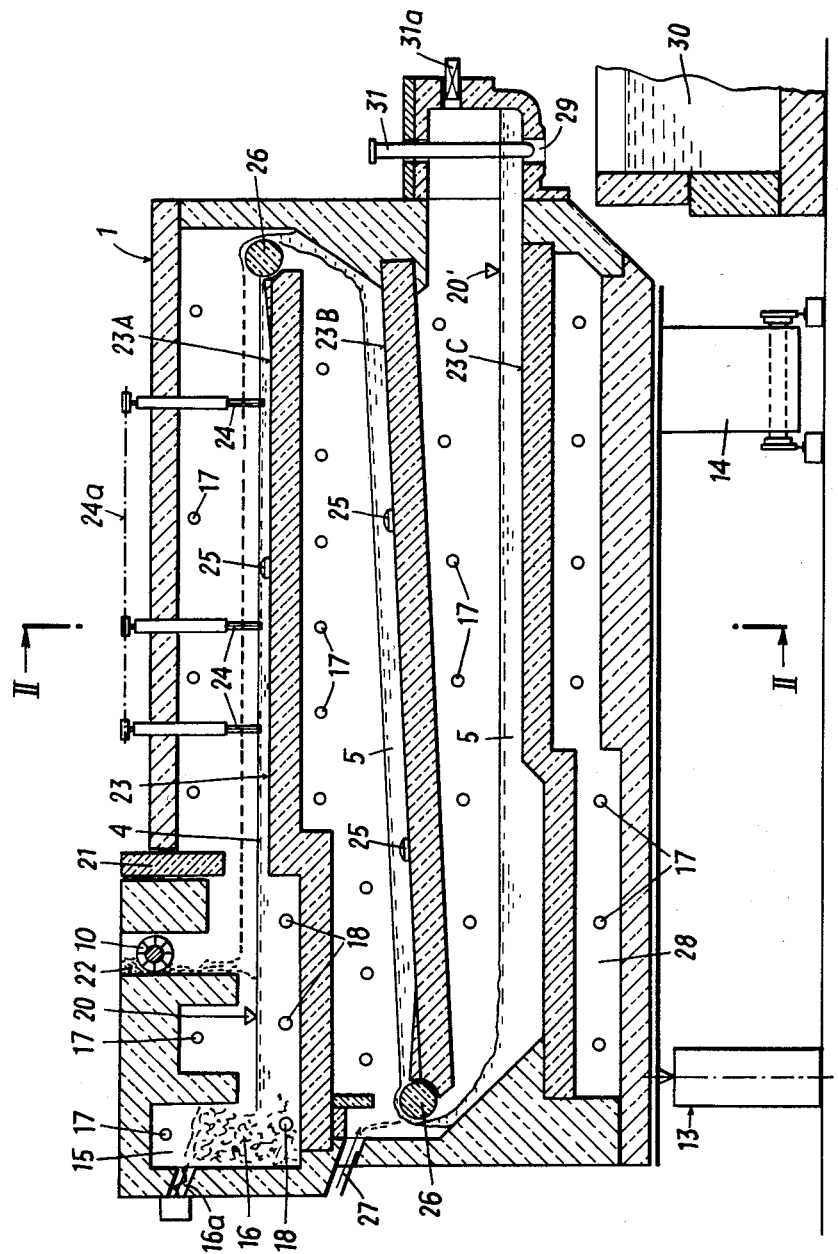
FIG. 1 is a longitudinal section of an apparatus according to the present invention.

An apparatus according to the present invention consists of a melting furnace 1 which is pivotable through approximately 180° about a vertical axis passing through a pivot bearing 13. Such pivoting is preferably achieved by two carriages 14 arranged parallel to the axis of the melting furnace 1.

Inside the melting furnace 1 there is a track 23 which, if appropriate, is inclined up to 3° relative to the horizontal and which is formed by sections 23A, 23B and 23C following one another and arranged underneath one another. Located in front of the upper, or inlet, end of this track 23 is a melting chamber 15 to which cullet 16 can be supplied through a channel 16a, which can be shut off by means of a slide, not shown, from a supply vessel, not shown, provided with a feeding device, not shown. Located in the regions of the bottom of the melting chamber 15 are electrodes 18 which pass through the side walls of the melting chamber 15. Furthermore, burners 17 are located in the upper region of the chamber 15 which is divided by at least one bridge wall. Between the melting chamber 15 and the track 23, there is a vertically adjustable slide 21, by means of which the melting chamber 15 can be closed relative to the track 23.

Figure 4:
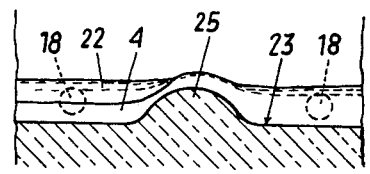

In the region of the upper end of the track 23, there is also at least one channel with a feeding roller 10, via which raw material components 22 can be fed to the track 23 from supply vessels or from pre-heating devices, not shown. Furthermore, vibrating and mixing devices, not shown, located after the feeding rollers 10 can be provided in the channels. Sills 25, the function of which is explained with reference to FIG. 4, are located on the bottom of the track 23 along its course. Moreover, further electrodes can also be located along the course of the track 23, passing through the side walls of the latter. Above the track 23, there are burners 17 and/or electrical heaters. Vertical agitator devices 24, which can be driven by means of a horizontal shaft 24a, pass through the ceiling wall of the melting furnace 1. Agitator devices (not shown) passing through the side walls of the relting furnace 1 and taking effect in the sections 23B and 23C can also be provided. The track 23 is formed by plates made of refractory material.

At the transition from the section 23B to the section 23C, there is a further feed channel in which a feed device 27 for refining materials is provided. Also located at each of the ends of the sections 23A and 23B are conveying rollers 26, in front of which are mounted sills located in the track. These conveying rollers 26 must be made of a material which is not attacked by the aggressive glass melt. Thus, these conveying rollers 26 can be made of ceramic material, so that the glass melt adheres to the conveying rollers 26 as little as possible. The conveying rollers 26 can also have assigned to them heaters, not shown, by means of which they are heated to such a degree that the glass melt flows off them.

In the end region of the chamber 15 and of the section 23C of the track 23 are located glass-level controllers 20 and 20', by means of which the feeding rollers 10, the operation of the conveying rollers 26 and the adjusting movement of ram 31 assigned to an outflow 29 can be controlled. The outflow 29 opens into a collecting tank 30 or in a trough. An inspection orifice 31a is provided near the outflow 29. Finally, underneath the section 23C there is a burner space 28 which has further burners 17 and by means of which the section 23C can be heated from below.

This apparatus operates as follows;

Cullet or frit 16 is introduced through the feed channel 16a into the filling part of the melting chamber 15 via a feeding device from the supply vessel assigned to the chamber 15. This cullet is then heated by the burners 17 to a temperature of approximately 900° C., as a result of which it is melted. The electrodes 18 are then pushed in through the side walls and are used to bring the molten mass to that temperature at which it has the necessary flowability or viscosity to form a glass-melt flux 4. The trough for the glass-melt flux 4 is limited by the melting track 23 or by its end face, thereby guaranteeing that the electrodes 18, preferably made of molybdenum, are constantly covered by the glass-melt flux, the inflow of air being prevented as a result.

The raw material components 22 necessary for producing the particular type of glass desired are applied to the surface of this glass-melt flux 4, by means of the feeding roller 10, of which there is at least one, separately from one another or at least partially premixed in the requisite proportions. The quantity of raw material components 22 applied to the glass-melt flux 4 is determined by the desired quantitative ratio of glass-melt flux 4 to raw material components 22. This ratio is in the region of one part of glass-melt flux, formed by cullet or frit melted down, and one part to nine parts of raw material components. The layer quantity produced per unit time and consisting of the glass-melt flux and the raw material components is directly proportional to the quantity of molten material drawn off by the rollers 26.

Because the raw material components 22 are applied in thin layers to the glass-melt flux 4 which is fed from the chamber 15, the raw material components 22 are melted down completely, at the same time being partially mixed with the glass-melt flux 4, in interaction with the heat which is additionally supplied by the electrodes, the burners or the heaters 17 and by means of which a temperature of at least 1200° C. to approximately 1500° C. is generated. Mixing is assisted by the agitator devices 24 and the flow of the glass-melt flux 4 via baffles or via the sills 25, and the formation of layers with inclusions of raw material components not sufficiently melted down, if at all, is prevented. Furthermore, the escape of dissociation gases is accelerated as a result. The conveying speed or the retention time of the glass-melt flux 4 in the section 23A or of the molten flux or glass melt 5, formed by melting in the raw material components 22, in the section 23B is controlled by the rollers 26 provided at the ends of the sections 23A and 23B. Refining materials are introduced at the end of the section 23B in order to remove gas inclusions completely.

The feeder 27 for the refining materials is arranged in such a way that the latter are supplied to the glass-melt mass when it is already in the liquid phase. This prevents premature evaporation. As explained with reference to an exemplary embodiment of the production of soda lime/silica glass, the formation of silica, occurring at approximately 800° C. to 900° C., takes place in section 23A, the glass-formation phase reached at approximately 1200° C. takes place in section 23B, and refinement and, finally, homogenization occur in section 23C. The operating temperature of the melting furnace 1 is approximately 1500° C. Since the thermal/chemical reactions in the initial phase require a considerable amount of time, energy is saved to a significant extent by means of preheating.

Heating, which can take place per se exclusively by means of electrodes, can be carried out by gas burners 17 located above and below the melting track 23, in view of the fact that there is no current available or the current costs are very high. The glass-melt flux 4 or the molten flux 5 is heated by these gas burners from above as a result of radiation and convection and from below as a result of heat conduction through the plates of the melting track 23. As a result, because of the advantageous relationships between space and layer, an extremely energy-saving melting cycle can be carried out, thereby necessitating, from preheating to refinement, an outlay of energy which is substantially less than in known installations.

The refined homogeneous glass passes via the outflow 29 into the collecting tank 30 or into a collecting trough where it cools to the temperature necessary for mechanical processing, whereupon it is processed further in the desired way.

Figure 2:
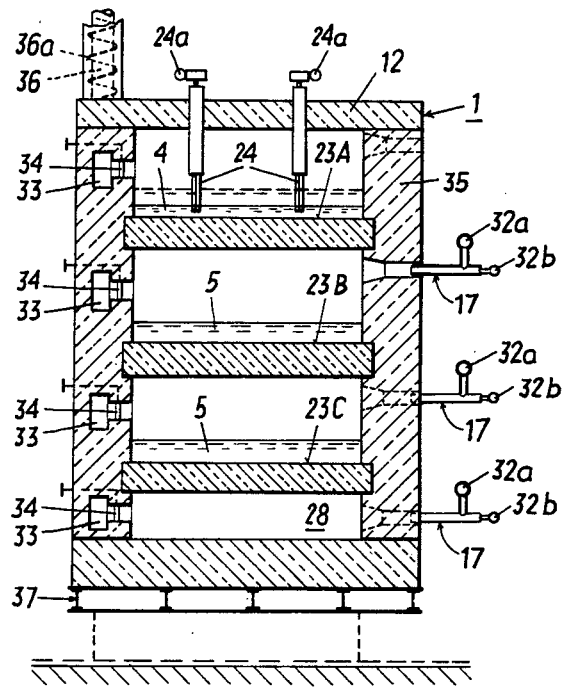
FIG. 2 is a section taken on line 11—11 of FIG. 1, on a scale larger than that of FIG. 1, FIGS. 3 and 4 show details of the apparatus of FIG. 1, on a scale larger than that of FIG. 1.

FIG. 2 illustrates the mode of operation of the burners 17. A gas/air mixture is fed to the burners 17 via air and gas lines 32a and 32b. The burner flames sweep over the molten material. The waste gases pass via controllable throttle flaps 34 into draw-off channels 33, from which they are conveyed past a heat exchanger 36a via a collecting pipe 36. The burner air is preheated in the heat exchanger 36a. The furnace wall 35 consists of refractory bricks which are preferably fusion-cast. It is insulated towards the outside, for example by means of ceramic fiber material. This illustration also shows the agitator devices 24 which pass through the ceiling wall 12 of the melting furnace 1. A double base plate 37 reinforced by ribs and having vertically and laterally adjustable accessory devices supports the structures or retaining structures necessary for the equipment.

Figure 3:
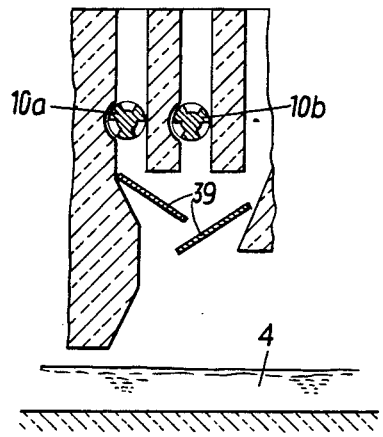

FIG. 3 shows two feeding rollers 10a, 10b, by means of which raw material components can be supplied in two groups. A batch of a first portion of the raw material components is fed to a first feeding roller 10a from a preheating device via a vibrating distributor. The second portion of raw material components is fed from the preheating device, via a vibrating distributor, to a second feeding roller 10b located behind the former in the direction of the glass-melt flux. These portions are applied to the glass-melt flux 4 by means of a vibrating device 39.

FIG. 4 shows diagrammatically how melting, mixing and homogenization are accelerated by providing sills 25 and at the same time utilizing the glass-melt flux 4. This is because the glass-melt flux 4 rises up at the sill 25 as a result of its viscosity, and portions of the raw material components 22 which are still insufficiently melted and have accumulated in front of the sill 25 are removed by the glass-melt flux 4, that is to say carried along by it, and subsequently melted down in it. This too improves melting down and homogenization along the track 23.

Figure 5:
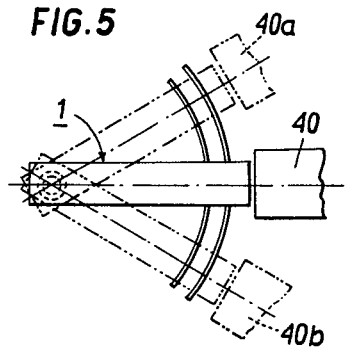
FIG. 5 is a plan view of the apparatus according to FIG. 1 in a diagrammatic representation and on a smaller scale.

Since the melting furnace 1 is pivotable, as can be seen from FIG. 5, it is possible to adjust it to another stationary production device 40a, 40b without difficulty. This is because all the drive and control elements arranged laterally are mounted or supported on a common base plate, the raw material feed and preheating devices are also located on a supporting structure arranged on it, and the particular component is transferred on a fixed feed via the pivoting axis of the furnace.

As will be familiar to those skilled in the art, the molten material located in the melting furnace 1 has to be discharged before a melting operation carried out with another glass batch can be started by means of appropriate controls for another production device. Since different production devices may also necessitate different working heights in relation to the furnace, the base plate carrying the melting furnace 1 is also vertically adjustable in a known way.

Figure 6:
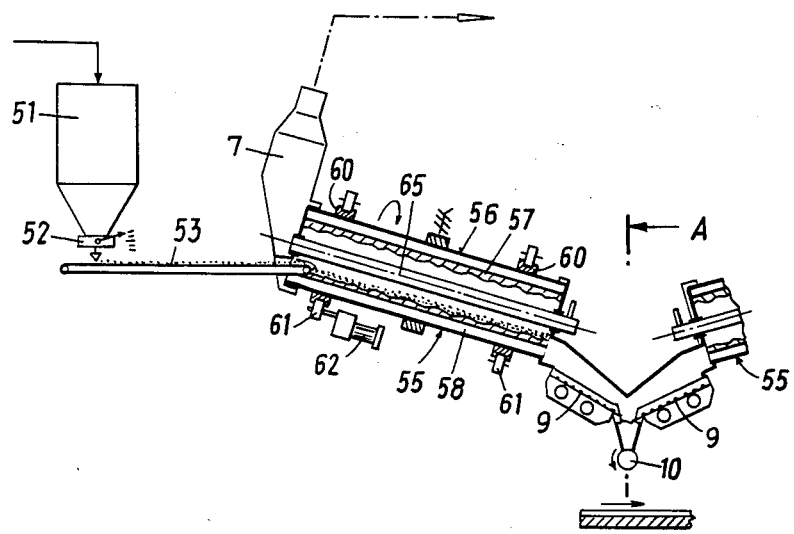
FIG. 6 is a side view of a preheating device for preheating raw material components to be supplied to the apparatus shown in FIG. 1.
Figure 7:
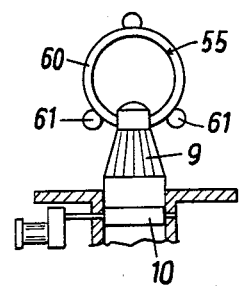
FIG. 7 shows the preheating device of FIG. 6, as seen in the direction of the arrow A thereof.

FIGS. 6 and 7 illustrate a device for preheating the raw material components. This device has assigned to it a supply vessel 51 for the mixed raw material components, from which a raw-material batch can be supplied to a pre-heating drum 55 by means of a conveyor belt 53 via a measuring device 52. The drum 55 is rotatable about an axis inclined relative to the horizontal.

The preheating drum 55 has an outer wall 56 made of sheet steel, the inner face of which is made heat-resistant by means of ceramic insulating fibre material, and an inner wall 57 which is made of ceramic material. Between the two walls 56 and 57 there is an annular space 58 which is designed with bulkheads offset relative to one another or with helical guide devices.

The outer wall 56 is equipped with running rings 60 which are supported on rollers 61 mounted so as to be fixed to the frame. One of the rollers 61 can be driven by means of a motor 62. A rigidly fastened tube 65 is located inside the drum 55. This tube 65 can consist of two half-shells, the upper half-shell being made of refractory material of low thermal conductivity and the lower half-shell being made of material of good thermal conductivity. Infrared heating is provided inside the tube 65.

A gas draw-off device 7 is connected to the upper end face of the drum 55. A vibrating distributor 9 which, if appropriate, is also heated, feeds at least one feeding roller 10, the vibrating distributor 9 being provided adjacent to the lower end face of the drum 55.

Raw material components are fed to the rotary drum 55 from the supply vessel 51 by means of the conveyor belt 53 via the measuring device 52. The drum 55 is rotated by means of the motor 62. Hot burner gases generated by means of burners are conveyed through the annular space 58 and subsequently pass into the draw-off device 7. The tube 65 is likewise heated. As a result, the raw material components fed into the rotating drum 55 and circulated in the latter are heated from above and below to the desired temperature below the sintering temperature of a eutectic melt. The batch heated in this way is fed to the feeding roller 10, of which there is at least one, via the vibrating distributor 9.

What is claimed is:
1. Apparatus for producing glass comprising:
a furnace;
means for introducing a material selected from the group cullet and glass melt forming frit into the furnace at an upstream side and at a location upstream from a location at which a glass melt is formed in said furnace;
means for melting said material to form a flux upstream from said location at which said glass melt is formed;
a track along which said flux is continuously displaced;
means for guiding said flux along the track;
preheating means for preheating raw material components;
means for applying the preheated raw material components to the surface of the said flux at a location upstream of said location at which said glass melt is formed, said track being shallow and inclined and of a length having sufficient heating means to melt said raw material components before said raw material components reach said melt by entrainment with said flux along said track;
heating means for melting the raw material components so as to form with said flux the said glass melt; and
means for introducing refining materials into the furnace so as to refine the glass melt.
2. Apparatus according to claim 1 in which the means for melting said raw material components is disposed at an inlet portion of the track.
3. Apparatus according to claim 2 in which the last-mentioned means comprises a subdivided chamber.
4. Apparatus according to claim 1, in which mixing means are provided to mix the raw material components in the said flux.
5. Apparatus according to claim 1 in which the means for applying the raw material components to the flux comprise metering devices and vibrating devices downstream of the metering devices, the vibrating devices being adapted to mix the raw material components.
6. Apparatus according to claim 1, in which heaters are arranged along the track.
7. Apparatus according to claim 1, in which baffles are provided along the course of the track.
8. Apparatus according to claim 7 in which the baffles assist dissociation gases to escape.
9. Apparatus according to claim 1, in which there are refractory agitators which pass through a ceiling of the furnace and by means of which the raw material components applied to the flux can be mixed with the latter.
10. Apparatus according to claim 1, in which there are agitator devices which pass through side walls of the furnace and by means of which currents are caused in the glass melt, layer formation is prevented and degassing is assisted.
11. Apparatus according to claim 1, in which the furnace is mounted so as to be adjustable about a vertical axis as a single unit.
12. Apparatus according to claim 1 in which the preheating means comprises a heatable drum which is rotatable about an axis inclined to the horizontal and at the upper end face of which the raw material components can be supplied and from the lower end face of which they can be discharged.
13. Apparatus according to claim 12 in which the rotary drum is double-walled to provide an annular space, the raw material components being guided in the interior and the annular space being heatable by means of burner gases.

14. Apparatus according to claim 12 in which a heater is located in the interior of the rotary drum.

15. Apparatus according to claim 12, in which the rotary drum is provided with helical guide devices.

16. Apparatus for producing glass comprising:
a furnace;
means for introducing a material selected from the group cullet and frit into the furnace;
means for melting said material to form a flux;
a track;
means for guiding said flux along the track;
preheating means for preheating raw material components;
means for applying the preheated raw material components to the surface of the said flux;
heating means for melting the raw material components so as to form with said flux a glass melt; and
means for introducing refining materials into the furnace so as to refine the glass melt, said track being shallow and inclined and of a length having sufficient heating means to melt said raw material components before said raw material components reach said melt by entrainment with said flux along said track, the means for guiding the flux along the track comprising refractory rollers.

17. A process for producing glass comprising the steps of:
introducing at least one material selected from the group comprising cullet and glass-producing frit into a furnace and melting it therein to form a flux upstream of a glass melt;
continuously guiding the flux along a track to said melt;
applying preheated raw material components to the surface of the flux along said track, said track being shallow and of a length and with sufficient heating along its length to melt said raw material components before reaching said melt, said raw material components being substantially in the proportion of one part of flux to between one and nine parts of said preheated raw material components;
employing thermal energy to melt the raw material components so that the latter form with said flux a glass melt at a location along said track downstream from that to which said raw material components are applied to said flux; and
continuing to displace said glass melt along said track.

18. The method process defined in claim 17, further comprising the step of introducing refining material into said melt downstream of said location so as to refine said melt.

19. The process defined in claim 18 wherein said raw material components are preheated to a temperature below the sintering temperature of a eutectic melt before being applied to said flux.

20. The process defined in claim 19 wherein said raw material components are preheated to a temperature of substantially 350° to 450° C.

21. The process defined in claim 18 wherein said raw material components are mechanically mixed with said flux after being applied thereto.

22. The process defined in claim 18 wherein said flux together with the raw material components applied thereto are moved along said track at a speed of 5 to 10 cm/min.

23. The process defined in claim 18 wherein said material components are applied to said flux separately from one another.

24. The process defined in claim 18 wherein heat is supplied to said flux along said track by ohmic generation of heat with electrodes projecting into said flux.

25. The process defined in claim 18 wherein heat is supplied to said flux and to said gas melt from heaters heating the surface of said flux and said gas melt.

26. The process defined in claim 18 wherein said flux and said gas melt are heated from below along said track by heat conduction from plates which form said track and which are heated along the underside of said plates.

27. The process defined in claim 18 wherein said track has a plurality of superposed sections, said refining materials being introduced at the start of a last section of said track.

* * * * *